US006856852B1

(12) United States Patent
Bruinsma et al.

(10) Patent No.: US 6,856,852 B1
(45) Date of Patent: Feb. 15, 2005

(54) METHOD AND MEANS FOR CONTROLLING THE OPERATION OF A MACHINE BASED UPON THE WEARING APPAREL BY THE MACHINE OPERATOR

(75) Inventors: Theo R. Bruinsma, Oss (NL); Paul J. Joynt, Ankeny, IA (US); Matthew Bergman, Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 10/688,022

(22) Filed: Oct. 17, 2003

(51) Int. Cl.[7] ............................................... G06F 19/00
(52) U.S. Cl. ...................... 700/177; 452/125; 452/132; 340/532
(58) Field of Search ......................... 700/177; 452/125, 452/127, 132, 133; 307/116, 326; 250/214, 221; 340/532

(56) References Cited

U.S. PATENT DOCUMENTS

| | | |
|---|---|---|
| 3,912,924 A | 10/1975 | Barrett, Jr. |
| 3,949,661 A | 4/1976 | Greider |
| 4,794,273 A | 12/1988 | McCullough et al. |
| 4,996,742 A | 3/1991 | Townsend |
| 5,025,175 A | 6/1991 | Dubois, III |
| 5,083,973 A | 1/1992 | Townsend |
| 5,101,141 A * | 3/1992 | Warner et al. .............. 315/297 |
| 5,148,053 A | 9/1992 | Dubois, III |
| 5,160,289 A | 11/1992 | DuBois, III |
| 5,201,684 A | 4/1993 | DeBois, III |
| 5,272,946 A | 12/1993 | McCullough et al. |
| 5,315,289 A | 5/1994 | Fuller et al. |
| 5,669,809 A | 9/1997 | Townsend |

FOREIGN PATENT DOCUMENTS

EP          0 362 937 A2   11/1990

* cited by examiner

*Primary Examiner*—Leo Picard
*Assistant Examiner*—Charles Kasenge

(57) ABSTRACT

A method and apparatus that uses safety apparel that has an identification element so that a sensor on a machine may detect the presence of the identification element. Upon detecting the presence of the identification element, the sensors electronically activate a series of switches and relays that allow the machine to operate. A plurality of relays can be set up so that when certain operational parameters occur, or do not occur, the machine is shut down. This includes a timing circuit to ensure the machine is being properly operated. Once the machine shuts down the operator must repeat the procedure of placing the identification element in communication with the sensors.

20 Claims, 5 Drawing Sheets

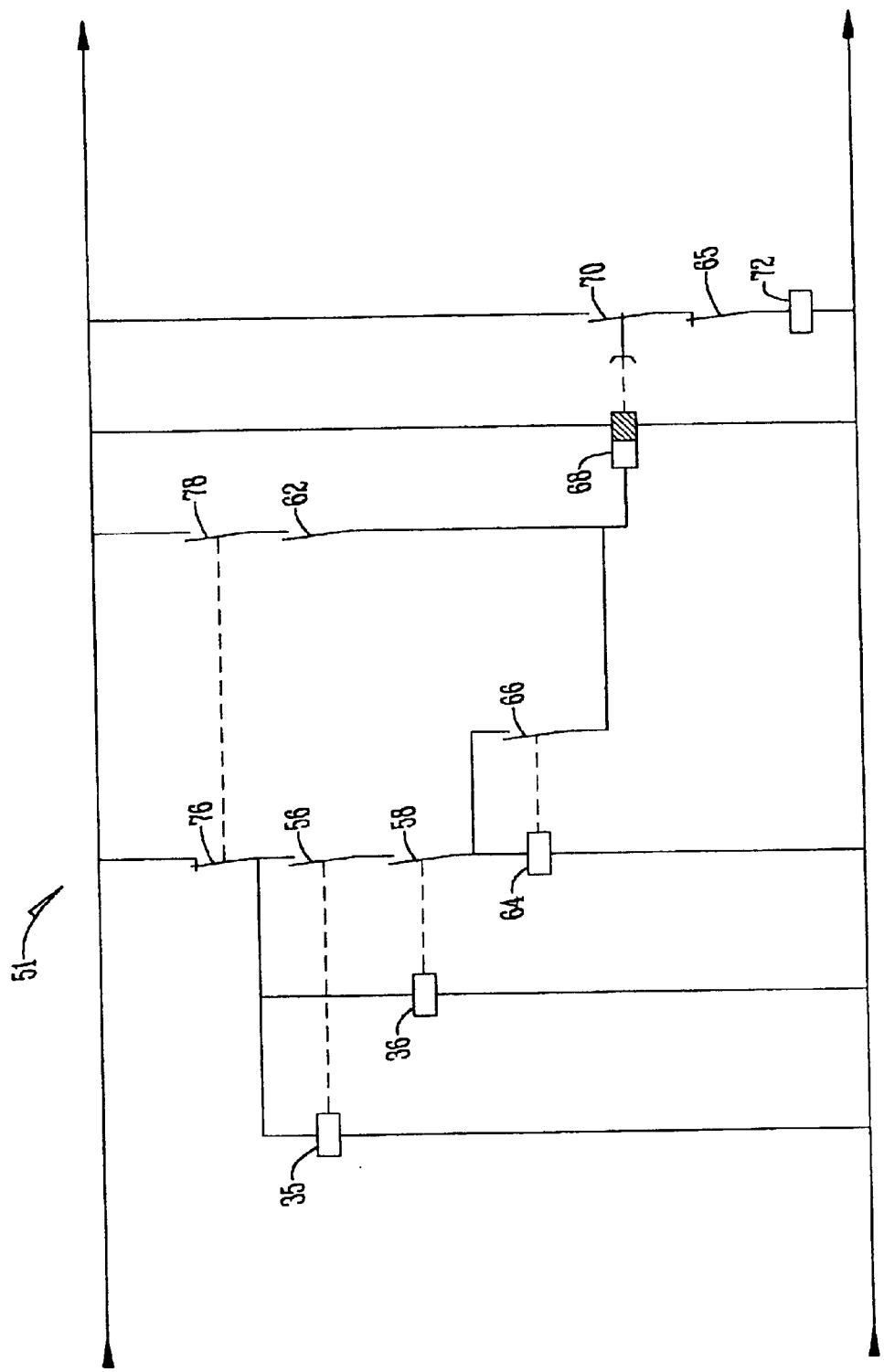

METHOD AND MEANS FOR CONTROLLING THE OPERATION OF A MACHINE BASED UPON THE WEARING APPAREL BY THE MACHINE OPERATOR

BACKGROUND OF THE INVENTION

Protective apparel such as gloves are regularly worn by machine operators to make the operation of some machines safer. Gloves for example have been designed in order to prevent one's hands from being cut by a cutting blade. Prior art discloses several types of mechanisms that attempt to prevent or minimize the possibility of operators being injured when working with machines. These devices require the use of mechanisms, special mats, shoes, or other equipment that is cumbersome, expensive and unreliable. These safety devices give a false sense of security to the operator and can add additional hazards to the machine. Furthermore, prior art has mainly focused on safety devices that only protect the machine operator and not third parties.

It is therefore desired to provide a system that will ensure that a machine will not operate unless the apparel is properly worn. As a result, operators of the machine will be forced to properly wear their apparel and unprotected third parties will be unable to operate the machine without the proper use of the apparel.

The primary object of the present invention is to provide a system that ensures a machine will only operate when proper apparel is worn.

It is another object of the present invention to provide a machine that can detect whether or not an operator is wearing a set of safety gloves.

Yet another object of the present invention is to use magnets incorporated into apparel as part of a sensor system to ensure that the apparel is being worn during the operation of a machine.

Yet another object of the present invention is to provide a machine that has a control system that will automatically shut down if an operational procedure is not performed.

These and other objectives, features, and enhancements will be provided by the present invention.

BRIEF SUMMARY OF THE INVENTION

The present invention is method and a machine using said method that uses sensors in a control circuit to prevent the machine from operating unless the operator is wearing proper protective apparel. The machine also ensures that the protective apparel is in the correct position before startup. The control circuit also stops the machine from operating if the operator does not operate the machine for a predetermined amount of time. The control circuit also senses if an operator is attempting to circumvent the circuit by placing apparel permanently in front of the sensors.

BRIEF DESCRIPTION OF THE DRAWINGS

FIG. 6 shows the low voltage control circuit of the electrical system of FIG. 5.

DESCRIPTION OF THE PREFERRED EMBODIMENT OF THE INVENTION

Figure 1:
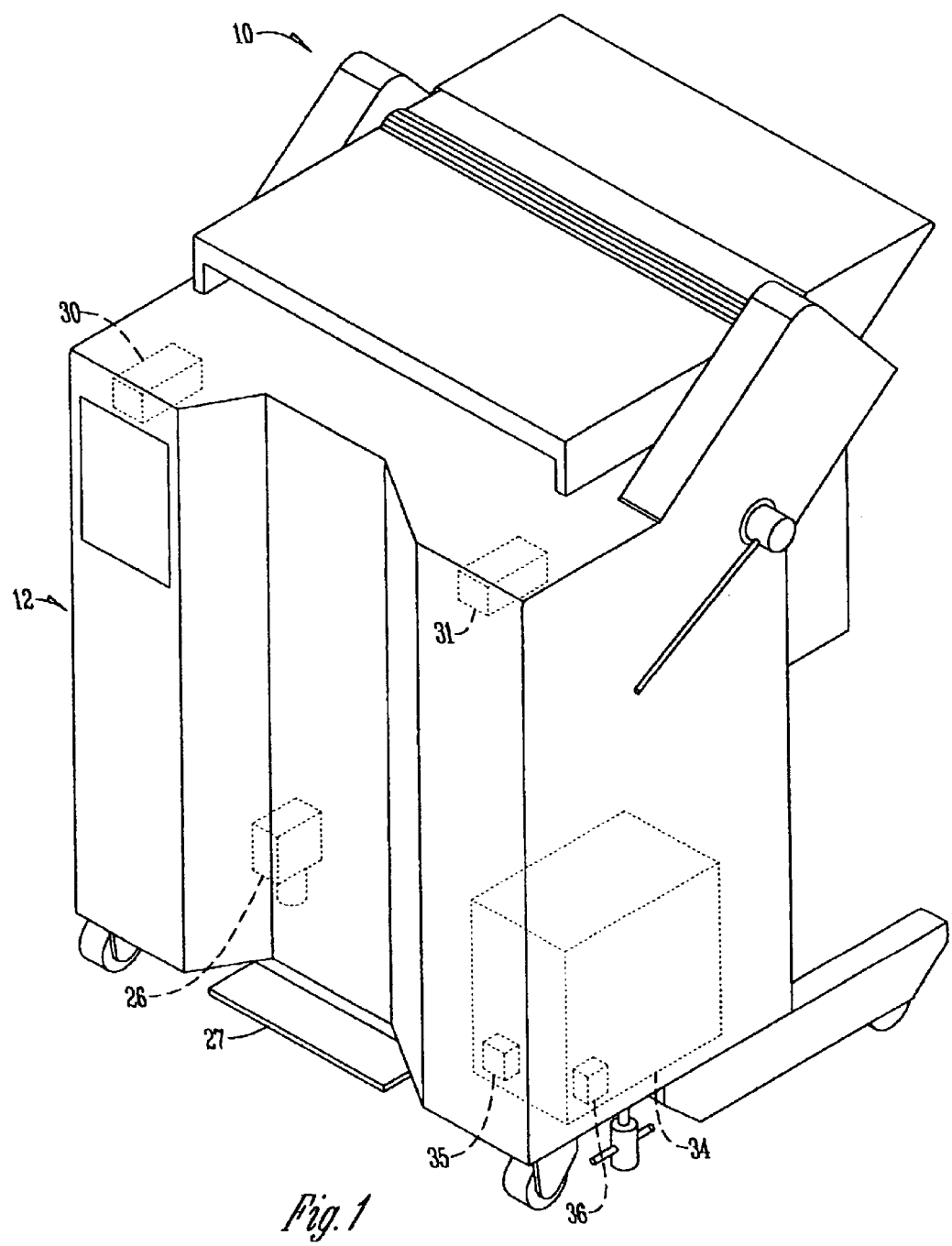
FIG. 1 is a perspective view of a skinning machine.
Figure 2:
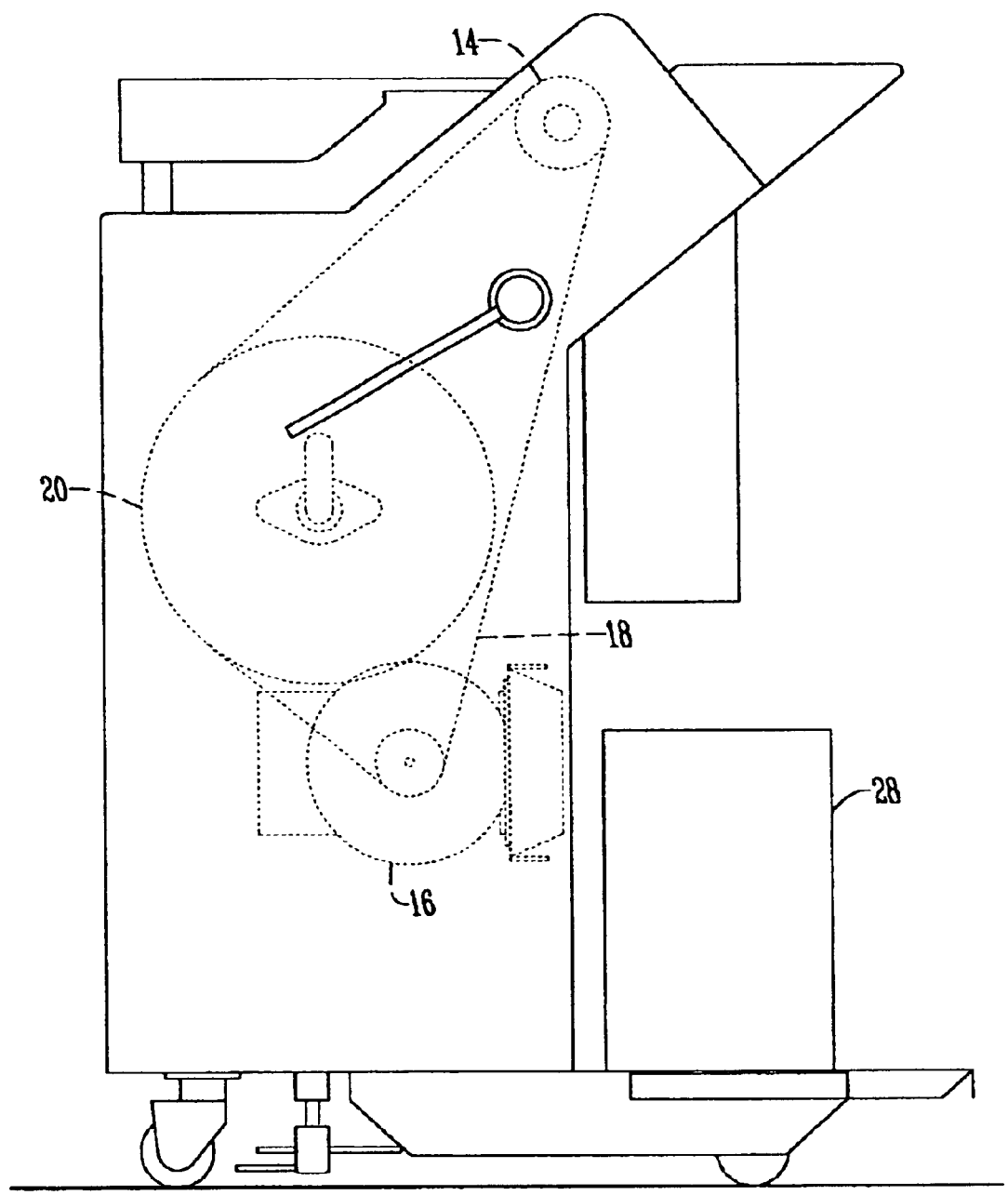
FIG. 2 is a side view of a skinning machine showing the drive system.
Figure 3:
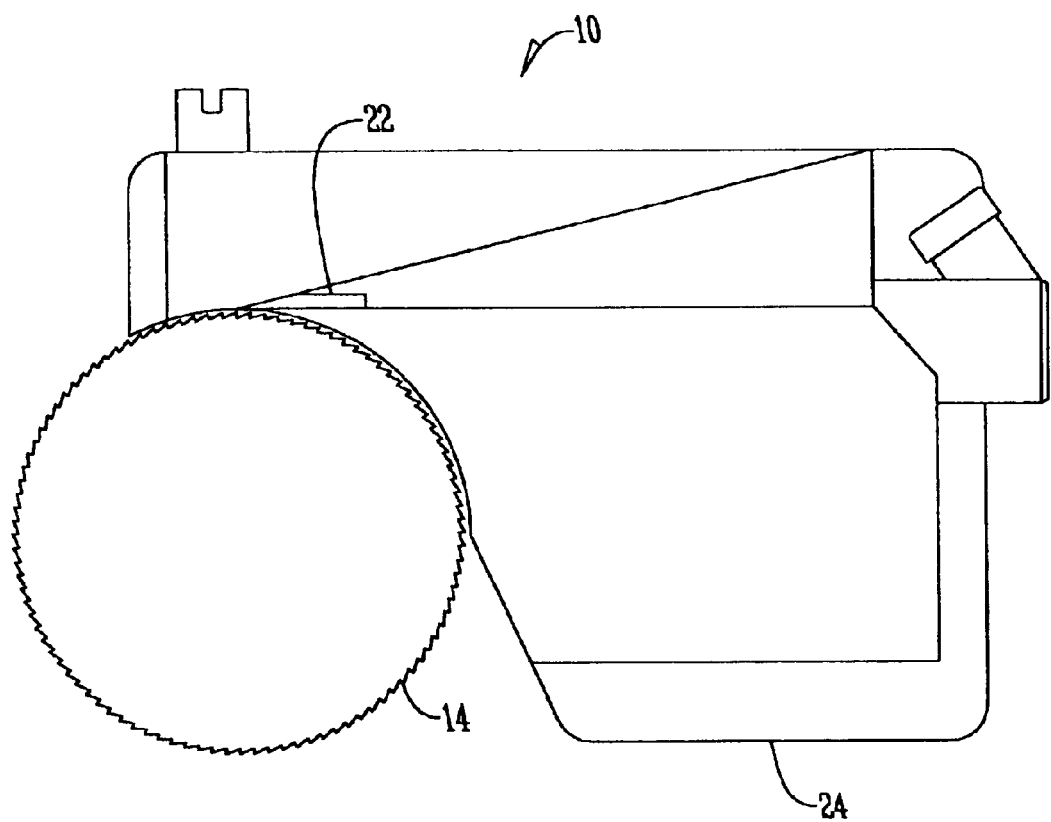
FIG. 3 is a side view of the toothroll, shoe, and blade of the skinner.

FIGS. 1–3 show a skinning machine 10 that has a frame 12 and toothroll 14 that is rotated via a power mechanism that includes a power mechanism or motor 16 by drive system 18 using pulley 20. Parallel to the top of toothroll 14 is cutting blade 22 that is mounted onto shoe 24. The machine also has a foot switch 26 operated by foot pedal 27 that controls the toothroll 14. The material removed by the skinning process on machine 10 is deposited into collection container 28.

Within the machine frame 12 are one or more sensors. In one embodiment the skinner 10 has a first sensor 30 and a second sensor 31 mounted behind the stainless steel machine frame 12 that are able to sense an identification element such as magnet 32. It should be appreciated that other identification elements include a barcode, a piece of metal, a radio frequency transmitter, an electronic tag, a key, a SRM Sensormatic device, a color or shape, or any other suitably specified device sensors 30, 31 would be able to identify. The sensors 30, 31 communicate with control system 34 via control modules 35 and 36 to operate the motor 16.

Figure 4:
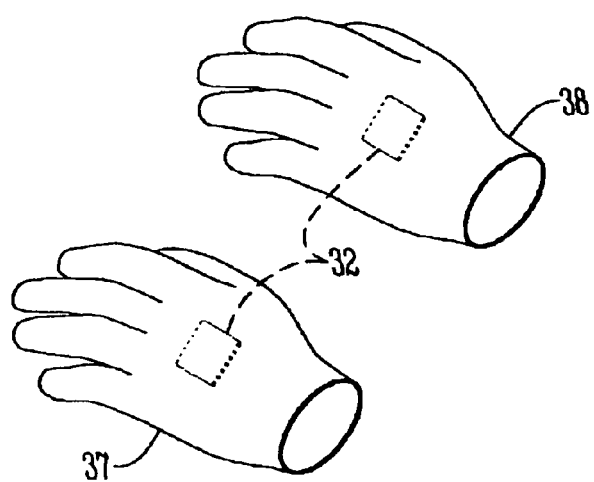
FIG. 4 shows a perspective view of protective gloves with fitted magnets.

FIG. 4 shows the protective gloves 37 and 38 of the present invention. Each glove 37 and 38 has an identification element 32 (e.g., a magnet) operably attached to the material of the glove 37 or 38. It should be appreciated that the magnets 32 may be operably attached within the gloves 37, 38, or by attaching the magnets 32 to the outside of the gloves 37, 38.

Gloves 37 and 38 are made of a material that is thick enough and stiff enough so the material will not be drawn into the blade 22. This prevents an unprotected hand from being drawn into the blade 22 causing skin to be removed. The glove material is also such that, if a glove 37 or 38 is torn and a loose part of the glove 37 or 38 is drawn into the gap between toothroll 14 and blade 22, the material will break, rather than pull the operators hand toward the blade 22, as would happen with a wire mesh glove.

Figure 5:
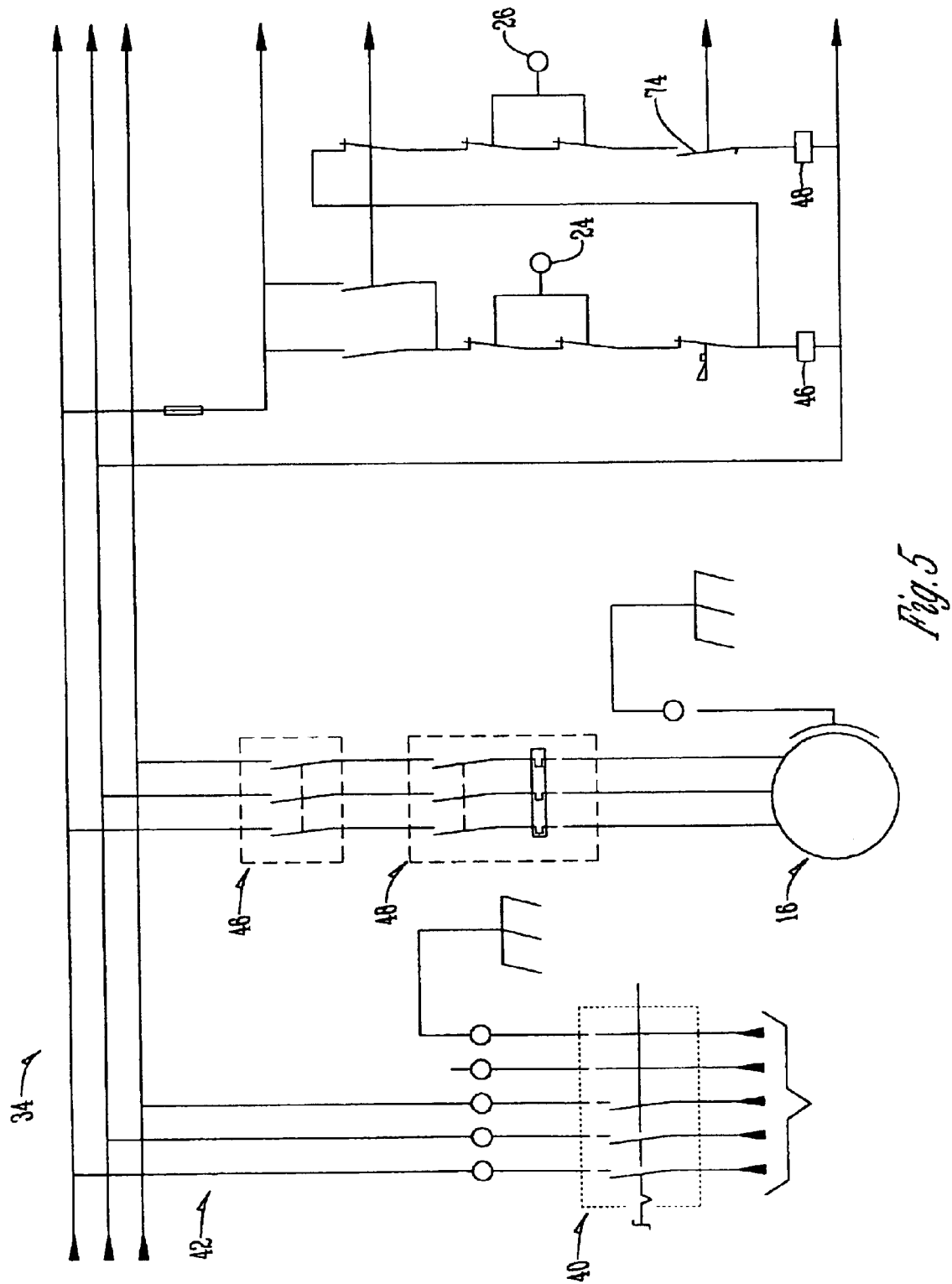
FIG. 5 is a schematic diagram of the electrical system of the skinner.

FIGS. 5 and 6 show schematic diagrams of the control system 34 of the present invention. The control system 34 has a main switch 40 that provides three phase power 42 to the motor 16. The control system is set up so that a first relay 46 and a second relay 48 must be energized for motor 16 to operate. For example when shoe 24 is in the correct position for running relay 46 can be energized. The system has a series of relays and modules that each control certain gates that determine whether motor 16 will be energized.

The control circuit 51 as seen in FIG. 6 has a pair of control modules 35 and 36 that contain control gates 56 and 58 respectively. In one embodiment the sensors 30 and 31 are both Elobau switches part number 120271 and the control modules 35 and 36 are Elobau part number 463 121B. Additionally in the control circuit second relay 48 controls gate 62. The circuit also has a third relay 64 that controls gates 65 and 66, a start timer 68 that controls gate 70, and a fourth relay 72 that controls gates 74, 76.

In operation both relays 46 and 48 must be energized in order for motor 16 to receive power. The system is therefore set up to provide several safety features that control whether the skinning machine 10 will be operational. A first safety feature is control modules 35 and 36 that are present to insure that an operator does not permanently place the gloves 37 and 38 in front of sensors 30 and 31 to circumvent the system. Sensors 30 and 31 have properties that enable them to detect a magnet 32 moving into their sensing field. It should be appreciated that as a function of control modules 35 and 36 magnet 32 will only be detected if it is moved into the sensing fields so that an operator may not permanently leave their gloves 37 and 38 in front of sensors 30 and 31. When a magnet 32 is moved into the sensing field of sensors 30 and 31 control modules 35 and 36 gates 56, 58 and 76 are closed and electric current goes to the third relay 64. Third relay 64 then closes gate 66 and opens gate 65. Gate 66 closing starts timer 68, and timer 68 in turn closes gate 70.

An additional safety feature is forcing the operator to go through a set of steps or a procedure when starting and operating the machine using of gloves 37, 38 and a timing system. Sensors 30 and 31 detect when a glove 37 or 38 having a magnet 32 moves into its sensing field. When at least one of the gloves 30 or 31 is moved away from its sensor 30 or 31 the third relay 64 is de-energized so that gate 65 is closed, allowing power via contact on timer 68 of the fourth relay 72. As a result, gate 76 opens, gate 78 closes and gate 74 of the fourth relay 72 closes, enabling power to the second relay 48 when foot switch 26 is activated. When the foot switch 26 is activated relay 72 resets the timer 68 through gates 78 and 62. When an operator turns off the skinning machine 10 the timer 68 begins timing the amount of time the skinning machine 10 is inoperative. If the skinning machine 10 is inoperative for a predetermined amount of time, timer 68 times out and gate 70 opens de-energizing relay 72. In one embodiment the predetermined amount of time is 10 seconds. When the fourth relay 72 is de-energized gate 74 opens so that the second relay 48 can no longer be energized by foot switch 26, thereby disabling skinning machine 10. Once the skinning machine 10 is disabled the operator must place the gloves 37 and 38 in front of sensors 30 and 31 to restart this process.

It should be appreciated from the set up of the control system 34 that the skinning machine 10 will stop operating when a controlled parameter is not detected or detected for too long a period of time by the control system 34. Hence, the control system 34 will stop operating if an operator does not follow the correct procedure, or steps, when operating the skinning machine 10. For example, if the skinning machine 10 only detects one magnet 32 the skinning machine 10 will not operate. If the gloves 37, 38 are placed in front of the sensors 30, 31 and are not removed the skinning machine 10 will not operate. Also, if the operator does not operate the skinning machine 10 for a time that exceeds a predetermined time the skinning machine 10 will not operate unless the correct startup procedures have reoccurred. If the skinning machine 10 has not been run within the time constraints expected during the proper operation of the skinning machine 10, the machine will not operate.

In operation, an operator causes the skinning machine to be operational by placing the gloves 37 and 38 in front of sensors 30 and 31 to enable the motor, subject to the foot pedal being depressed. This ensures that only an operator who is wearing the safety gloves 37 and 38 can enable the machine. Then if the correct procedure or series of steps are followed the skinning machine 10 will continue to operate. The first step involves placing meat to be skinned into the skinning machine 10 as the foot pedal is depressed to enable the motor. Then the operator has a first predetermined amount of time (e.g., 10 seconds), to skin the meat. Thus the timer 68 provides a check to ensure the operator has enabled the machine only for this limited time.

The control system 34 is also designed in such a way that if a component in the control system 34 fails or if a component is not in the correct position such as the shoe 24, the machine will not operate. It should also be appreciated that because normal operation of the machine involves stopping and starting, a second timer could be incorporated to set a maximum time for the machine to run continuously to ensure that the system is not bypassed by wedging the foot switch 26 in the run position. The skinning operation would consist of a series of steps. The first would be to enable the machine 10, the second would be to depress the footswitch 26 to start the toothroll 14 and skin the meat and the third would be to lift the footswitch 26 and stop the machine, so that the operator can pick up another piece of meat. Steps 2 and 3 could be repeated.

The control system would set predetermined maximum periods of time for the machine to be stopped or run. If these periods were exceeded, the machine would require re-enabling before it could be run again.

The present invention uses a magnet 32 integrated within the safety gloves 37, 38 in conjunction with a pair of sensors 30, 31 in order to ensure that the skinning machine 10 is being operated by a person wearing safety apparel. Thus, all of the objectives of the present invention have been accomplished.

It will be appreciated by those skilled in the art that other various modifications could be made to the device without the parting from the spirit or scope of this invention. All such modifications and changes fall within the scope of the claims and are intended to be covered thereby.

What is claimed is:

1. A method for controlling the operation of a machine based upon the wearing of apparel by the machine operator, comprising:

providing a machine with an operating power mechanism with at least one sensor associated with the power mechanism and being capable of wireless communication with an identification element associated with the apparel of an intended machine operator, so that the power mechanism will not function until the sensor has sensed the identification element when the identification element associated with the apparel of the intended machine operator is located in a predetermined position with respect to the machine.

2. The method of claim 1 wherein the identification element is associated with gloves worn by the intended machine operator.

3. The method of claim 2 wherein the operator must wear the gloves and present them to the machine while in a close predetermined position with respect to the machine to enable interaction between the sensor and the identification elements in the gloves to cause the operation of the power mechanism to commence.

4. The method of claim 1 wherein the operator must present the apparel being worn to the machine in a close predetermined position with respect to the machine to enable interaction between the sensor and the identification elements to cause the operation of the machine to commence.

5. The method of claim 1 wherein each identification element is comprised of one of the group of a magnet, a barcode, a radio frequency transmitter, an electronic tag, a SRM device, a metallic element, a color, a shape or any other suitably specified device.

6. The method of claim 1 wherein a plurality of sensors are on the machine to simultaneously react to separate identification elements before the power mechanism is made operational.

7. The method of claim 1 wherein the machine is a skinning machine.

8. The method of claim 1 wherein the operation of the machine involves a series of sequential functional steps, and a timer is associated with the power mechanism, controlling the operation of a machine based upon the wearing of apparel by the machine operator, and a time increment is associated with two of the steps, so that if the second of the steps is not commenced within the span of the time increment, the power mechanism will be rendered inoperative.

9. The method of claim 1 wherein checks are carried out before the machine can start and at predetermined intervals during the running of the machine.

10. The method of claim 1 wherein the sensors are positioned on the machine to coact with reactor elements associated with the apparel of the operator, so that the power mechanism will cease to operate whenever their association fails to take place.

11. The method of claim 9 wherein a control system is associated with the timer and the power mechanism so that if a series of sequential steps are not completed within a predetermined time sequence, the power mechanism will be disabled.

12. A machine comprising a frame, and a power mechanism for operating the same, at least one sensor on the frame adapted to sense the presence of an identification element on the apparel of a person intending to operate the machine, the sensor being associated with the power mechanism to prevent the power mechanism from being enabled without first sensing the presence of the identification element.

13. The machine of claim 12 wherein the sensor will enable the power mechanism only so long as it senses the presence of the identification element.

14. The machine of claim 12 wherein the identification element is associated with gloves worn by the person intending to operate the machine.

15. The machine of claim 12 further comprising a power mechanism having a timer electrically connected to the sensor.

16. The machine of claim 15 wherein the timer is associated with a first and second span of time increment so that when a first step of a cycle of sequential functional steps is not commenced with the first span of time increment the power mechanism will be rendered inoperative.

17. The machine of claim 16 wherein checks are carried out before the machine can start and at predetermined intervals during the running of the machine.

18. The machine of claim 12 wherein the machine is a skinning machine.

19. The machine of claim 12 wherein the identification element is comprised of one of the group of a magnet, a barcode, a radio frequency transmitter, an electronic tag, an SRM device, a metallic element, a color, a shape or any other suitably specified device.

20. The machine of claim 15 further comprising a plurality of sensors that simultaneously react to separate identification elements before the power mechanism is made operational.

* * * * *